United States Patent [19]

Giocastro et al.

[11] Patent Number: 4,548,096
[45] Date of Patent: Oct. 22, 1985

[54] COMPACT FLUID DRIVE TRANSMISSION

[76] Inventors: Joseph Giocastro, 64-28 Metropolitan Ave., Middle Village, N.Y. 11379; Salvatore Giocastro, 53-11 73 St., Maspeth, N.Y. 11378; Peter Giocastro, 64-28 Metropolitan Ave., Middle Village, N.Y. 11379

[21] Appl. No.: 639,086

[22] Filed: Aug. 9, 1984

Related U.S. Application Data

[63] Continuation-in-part of Ser. No. 448,845, Dec. 15, 1982, abandoned.

[51] Int. Cl.$^4$ ............... F16H 35/04; F16H 47/00; B60K 23/00; F16D 31/00
[52] U.S. Cl. ...................................... 74/650; 74/730; 180/76; 192/58 A
[58] Field of Search .................. 74/730, 650, 655; 60/330; 180/76, 242; 192/49, 58 A

[56] References Cited

U.S. PATENT DOCUMENTS

| | | | |
|---|---|---|---|
| 2,221,705 | 11/1940 | Glynn, Jr. | 74/650 |
| 2,287,498 | 6/1942 | Scofield | 74/650 |
| 2,335,544 | 11/1943 | Schnetzer | 74/730 |
| 2,438,040 | 3/1948 | Duhaime | 74/730 |
| 2,473,638 | 6/1949 | Cumming | 74/730 |
| 2,764,040 | 9/1956 | Butler | 74/730 |
| 4,040,310 | 8/1977 | Giroux | 74/730 |

*Primary Examiner*—Allan D. Herrmann
*Assistant Examiner*—Stephen B. Andrews
*Attorney, Agent, or Firm*—Lackenbach Siegel Marzullo Presta & Aronson

[57] ABSTRACT

A fluid drive transmission system removably mounted to the axle of a motor vehicle. A power output drum connected to the wheel forms in part a fluid chamber. A power input rotor keyed to the axle extends through the center portion of the drum. Rotor blades and drum blades are positioned in the fluid chamber opposite one another. Bearings and fluid seals are positioned between the drum and the rotor so that the rotor and drum rotate freely relative to one another and the system can be removed as a unit from the axle without breaking the fluid seals.

6 Claims, 3 Drawing Figures

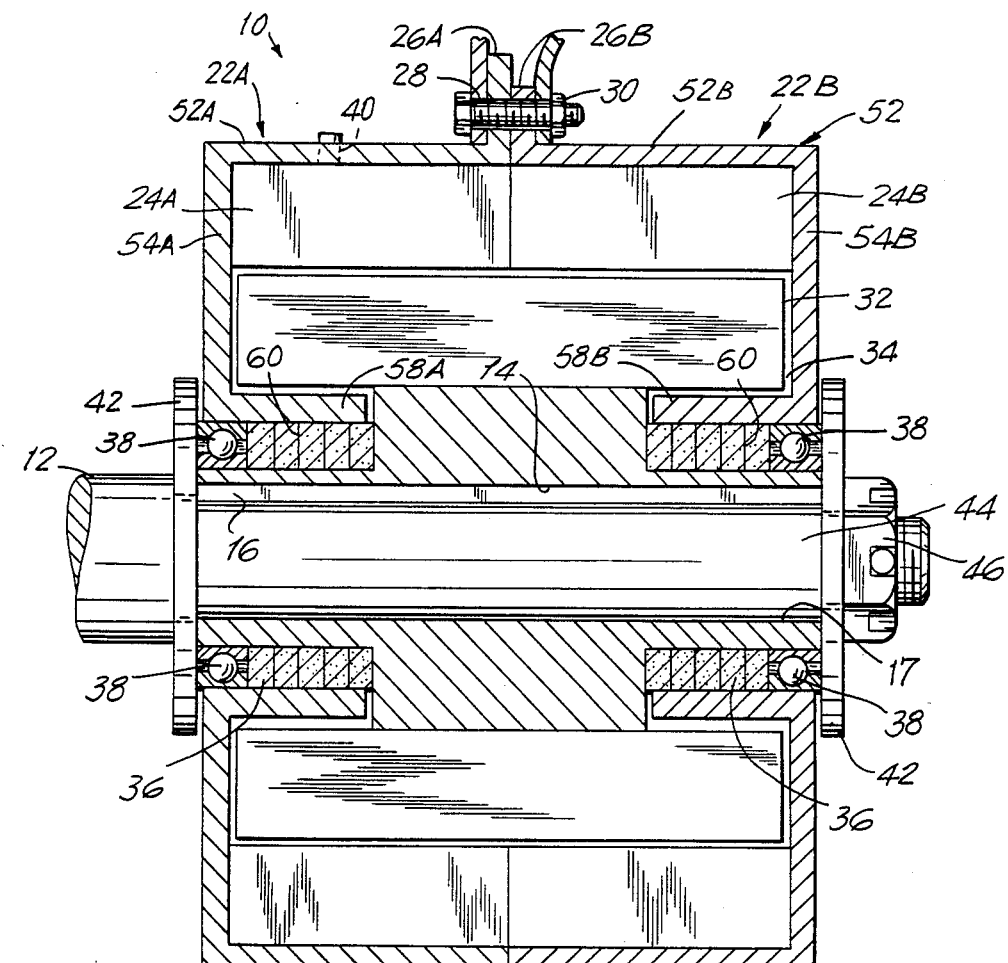
FIG.1
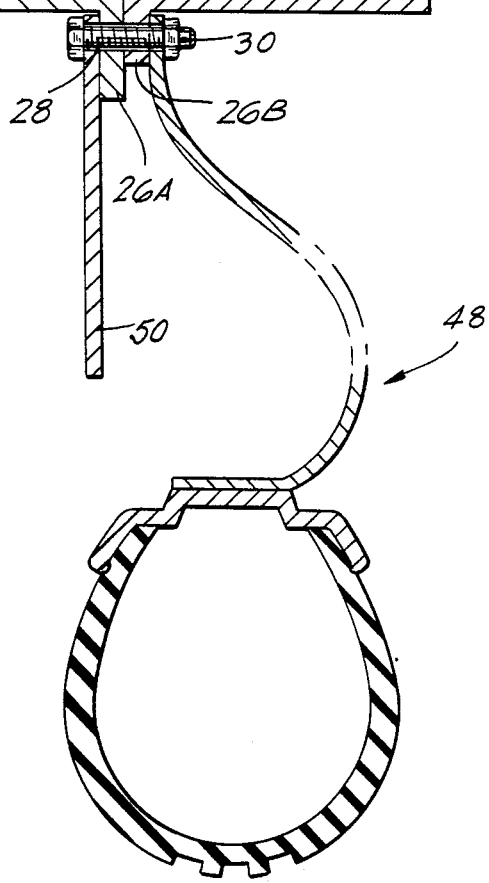

COMPACT FLUID DRIVE TRANSMISSION

This application is a continuation-in-part of our earlier filed copending U.S. patent application Ser. No. 448,845; filed Dec. 15, 1982, now abandoned, and entitled Horizontal Propelled Grease Coupling.

This invention relates to a fluid drive transmission system from a driven axle of a motor vehicle to a driven wheel.

The art of fluid drive transmission has a long history in the field of motor vehicles. The standard fluid drive transmission is positioned towards the front of the vehicle at the motor area and is associated with the drive shaft.

A fluid drive for a traction wheel of a motor vehicle is described in U.S. Pat. No. 2,287,498 issued to W. W. Scofield Feb. 8, 1941. This prior art transmission cannot be removed from the axle of the vehicle, however, without breaking the fluid seal between the impeller or rotor, and the rotatable housing or drum, and so, in effect, cannot be replaced without replacing the axle of the vehicle.

Another aspect of traditional automotive fluid drive transmissions is that the driving fluid used to fill the fluid chamber of a fluid drive unit is a lightweight fluid. A heavy-weight fluid would create excess stress on the long blades. A lightweight fluid, however, does not pass all its fluid drive from the inner impeller to the outer driver in certain cases. One case is when the motor is started, the fluid transmission goes into 100 percent slippage for approximately fifty rotations until enough inertial energy is created in the transmission fluid to pass on rotational energy. Another case where a standard fluid drive goes into slippage is during movement of the vehicle on the road when one of the wheels hits a non-traction surface such as ice or sand; in such an event, the non-gripping wheel will suddenly spin and this sudden increase in rotational speed will create a slippage situation in the fluid drive transmission.

Yet another problem area for fluid drive transmission is that during turning, the outside wheel goes into multiple turns as compared to the inner wheel, say on the order of five turns to one turn. The drive shaft may turn three times to one as compared to the inner wheel. The outside wheel does most of the pulling. This causes stress imbalance on the main drive shaft.

SUMMARY OF THE INVENTION

The primary object of this invention is to provide a fluid drive transmission, or fluid coupling, for each wheel of a motor vehicle.

It is another object of this invention to provide a fluid drive transmission that can be removably mounted to the axle of a motor vehicle.

It is another object of this invention to provide a fluid drive transmission that includes a rotor removably connected to the axle of a vehicle and a drum containing transmission fluid that is rotatable about the rotor.

It is another object of this invention to provide a fluid drive transmission having a unitary rotor and drum having input impellers and output blades respectively that is inexpensive to manufacture, simple to mount, and easy to maintain.

It is a further object of this invention to provide a replaceable fluid drive transmission that accomplishes the task of removing stress on the axle of a motor vehicle during turning, wherein the stress on the axle is relieved by having one wheel turning faster than its input rotor and the other wheel turning slower than its input rotor.

It is yet another object of this invention to provide a replaceable fluid drive transmission that will reduce rotational differential between one wheel hitting ice or soft sand and the other wheel gripping the road, wherein the gripping wheel will slow down slightly and the slipping wheel will continue to rotate.

BRIEF DESCRIPTION OF THE DRAWINGS

FIG. 1 is a sectional side view showing the major assembly members of the torque converter, or fluid drive transmission, system according to the present invention;

Reference is now made in detail to the drawings wherein similar reference numerals indicate corresponding parts throughout the three figures.

Figure 3:
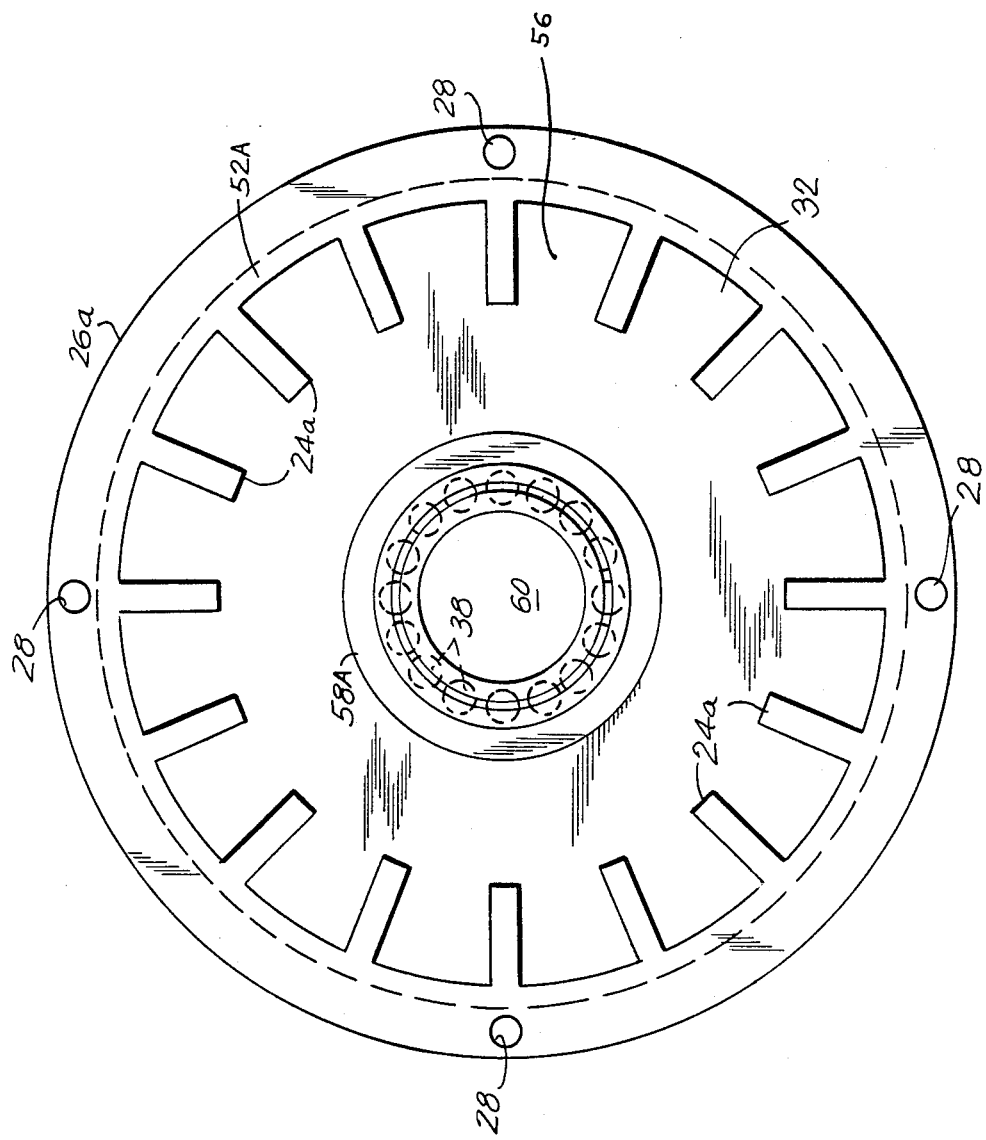
FIG. 3 is an end view or inward looking view of one of the pair of the power output drums with its inwardly extending vanes.

It is noted that the term impeller used in my U.S. patent application No. 448,845 referred to the combined rotor and rotor blades. In the description below, the term impeller is not used, since the rotor and rotor blades are described separately.

A grease torque converter, or fluid drive transmission system, 10 is shown in FIG. 1 and includes a power input axle 12 that is secured at its keyway 14 to a key 16 axially extending along the length of a bore 17 formed at the center of a power input hub, or rotor, 18; keyway 14 is adapted to slidingly receive key 16. A number of evenly spaced radially outwardly extending vanes, or blades, 20 are secured to the cylindrical surface of rotor 18 along its length. A power output drum 22 that includes a pair of mating inner and outer drum portions 22A and 22B respectively includes a number of evenly spaced radially inwardly extending vanes, or drum blades 24 that extend lengthwise from the inner surface of drum 22. Each drum portion 22A and 22B has a circumferential flange 26A and 26B respectively forming bolt openings 28 that are adapted to receive bolts 30 to secure drum portions 22A and 22B together to form unitary rotatable output drum 22. Drum 22 furthermore forms a housing within which are mounted power input rotor blades 20 and power output drum blades 24. As will be discussed in detail later, a portion of rotor 18 is mounted inside of the housing of drum 22. Drum 22 along with the portion of rotor 18 inside of drum 22 form a fluid chamber 32. A heavy fluid 34 such as grease or heavy oil is contained in chamber 32. Rotor blades 20 and drum blades 24, which face one another in chamber 32 in closely spaced relationship act to propel fluid 34 in chamber 32 into an energy transmitting torque force. Opposed sets of oil sealers 36 and a pair of opposed bearing units 38 are positioned between the outer portion of rotor 18 and the inner portion of drum 22. A threaded hole 40, ordinarily plugged, of preferably about ½ inch is formed at the top of drum 22 for filling chamber 32 formed with fluid 34.

In assembly, rotor 18 is inserted into either drum portion 22A or 22B and the mating half is placed around the other end of rotor 18 and drum portions 22A and 22B are secured together at flanges 26 by way of bolts 30 through bolt holes 28 to make the torque converter, or fluid drive transmission system, 10 in accordance with the present invention.

As shown in FIG. 1, a pair of washers 42 are mounted onto the spindle portion 44 of axle 12 at opposite sides of transmission system 10, one at the free end of spindle 44 and the other at the inner end of spindle 44 so that both press against transmission system 10, particularly against both rotor 18 and drum 22. The outer washer of washers 42 is rigidly held in place by a nut 46. A wheel 48 of the vehicle and disc brakes 50 are secured to drum 22.

My invention describes a fluid torque converter for the wheel and hub of a motor vehicle of such a construction that it can be applied to the two front wheels or to the four wheels of a motor vehicle, wherein the slippage in the converter is between 1 to 10 percent instead of the 100 percent slippage loss at idle speed in presently known converters. The same can be said during use on the road when one wheel spins on a slippery surface and does not pull while the other wheel is gripping the road wherein a 1 to 10 percent slippage loss instead of a 100 percent slippage in the non-gripping wheel causes both wheels to rotate at about the same speed, thus resulting in the non-gripping wheel remaining in a gripping mode, rather than spinning.

My invention also is useful during turning the vehicle where the 1 to 10 percent slippage loss, rather than the 100 percent slippage loss of traditional fluid drive transmissions, is advantageous in that it relieves stress on the front or rear axles. That is, the outside wheel will move several feet more than the inside wheel, and the inside wheel, which would ordinarily go into slippage with the outer rotor overriding the inner rotor or impeller, would be prevented in the present invention from slipping and subsequently scuffing on turns because of the greater rotational speed of the outside wheel.

Figure 2:
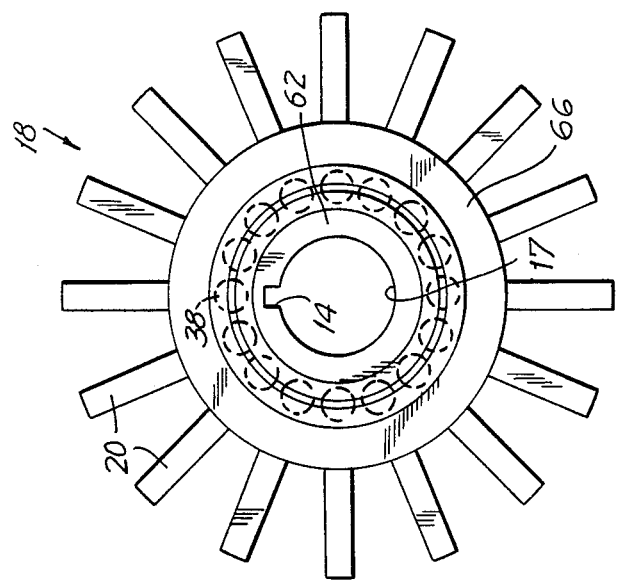
FIG. 2 is an elevational view of the power input impeller including power input rotor with broad-based vanes and showing the bearing between the rotor and the drum and the rotor keyway for locking to the wheel axle.

It is noted that as shown in FIGS. 1-3, my invention discloses a fluid drive transmission having horizontally broad, or wide, radially short vanes, so that a heavy grease fluid can be used. It is also noted that my broad, radially short vanes enable my invention to be easily mounted at the axle area of motor vehicle wheels.

I wish to make it known that if additional slippage between power input rotor 18 and power output drums 22 is needed when making turns, blades 20 and 24 could be stator blades or stator blades combined with free wheel of the propeller shaft. The arts of stator blades and free wheel are both well-known and need not be elaborated on here. It will be understood that the broad, radially short vanes, or blades shown in FIGS. 1-3 are sufficiently illustrated with the input and output members so that modifications can be made by those familiar with the art to adapt the system to specific purposes, such as the substitution of stator blades for the vanes illustrated or the addition of free wheeling with stator blades as mentioned above.

At this point, I will proceed to set forth in detail a particularly innovative feature of my invention relating to the replaceability of the transmission system.

Drum member 22 has a cylindrical outer wall 52 and opposed inner and outer end walls 54A and 54B that form a pair of opposed circular holes 56. Drum member 22 also includes a pair of inwardly extending opposed cylindrical inner members 58A and 58B forming opposing cylindrical hollows 60 connected to end walls 54A and 54B respectively at the rims of holes 56. Axle 12 is positioned through drum 22 at spindle portion 44 through hollows 60 of inner member 58. Wheel 48 is connected to drum 22 at outside flange 26B at intervals in a manner known in the art. Drum blades 24 are connected to the inner surface of outer wall 52. Drum blades 24 comprise a first set of drum blades portions 24A and 24B that are connected to drum portions 22A and 22B respectively.

Rotor 18 includes a cylindrical radially inner rotor portion 62 extending through drum member 22 and through hollows 60 of inner cylindrical members 58. Inner rotor portion 62 forms the previously mentioned cylindrical central bore 17 adapted to receive axle 12. Rotor 18 further includes a cylindrical radially outer rotor portion 64 connected to and positioned around inner rotor portion and disposed between the pair of hollow inner members 58. Outer rotor portion 64, the pair of cylindrical inner-members 58, the pair of end walls 54, and cylindrical outer wall 52 define fluid chamber 32. Drum blades 24 are connected to outer rotor portion 64 of rotor 18. Keyway 14, mentioned earlier, is formed by inner rotor portion 62 along the length of its bore 17.

My fluid drive transmission system is particularly adapted to be configured with short rotor and drum blades that can broadly extend at their bores along the spindle of the axle of the vehicle. The diameter of the system can be reduced to approximately five inches with the result that the system can easily be positioned at the hub of a vehicle about its wheel axle.

Although my invention has been described in detail, such description is intended as illustrative, rather than limiting to the embodiment shown, since the invention may be variously embodied and the scope of the invention is to be determined in accordance with the claims.

We claim:

1. A fluid drive transmission system for an axle member and a wheel of a motor vehicle, comprising in combination;

drum means positioned about said axle member and connected to said wheel, said drum means including a drum member having a cylindrical outer wall and opposed end walls forming a chamber, said drum means including a plurality of drum blades extending radially into said chamber approximately parallel to said axle member, said opposed end walls forming a pair of opposed circular holes and having a pair of inwardly extending opposed hollow cylindrical inner members connected to said end walls at the rims of said holes, said axle member being positioned through said drum member through said hollow inner members, said outer wall being connected to said wheel, rotor means connected to said axle and positioned within and rotatably connected to said drum means, said rotor means including a plurality of rotor blades extending radially into said chamber parallel to said axle member in closely spaced relationship with said drum blades, fluid means filling said chamber for passing torque from said rotor blades to said drum blades, bearing means positioned between said rotor means and said drum means for enabling said rotor member and said drum member to rotate relative to one another, sealing means associated with said bearing means for sealing said bearing means and for sealing said fluid means in said chamber, and means for removably connecting said rotor member to said axle member, whereby said transmission system may be removed as a unit from said axle member without breaking the sealing means.

2. A system according to claim 1, wherein said drum blades are connected to the inner surface of said cylindrical outer wall.

3. A system according to claim 2, wherein said rotor means includes a rotor member having a cylindrical radially inner rotor portion extending through said drum member at said pair of hollow cylindrical inner members and forming a cylindrical bore adapted to closely receive said axle member and having a cylindrical radially outer rotor portion connected to and positioned around said inner rotor portion and disposed between said pair of cylindrical inner members, said outer rotor portion, said pair of cylindrical inner members, said pair of end walls, and said cylindrical outer wall defining said chamber.

4. A system according to claim 3, wherein said plurality of rotor blades are connected to said outer rotor portion of said rotor member.

5. A system according to claim 4, wherein said drum member comprises a mating pair of drum member portions, and further including drum connecting means at the outer surface of said cylindrical outer wall for securing said pair of drum member portion to form said drum member.

6. A system according to claim 4, wherein said means for removably connecting said rotor member to said axle means includes at least one key portion axially extending from the surface of said axle member said inner portion of said inner portion of said rotor member forming a keyway along said bore adapted to slidingly receive said key.

* * * * *